United States Patent [19]
Lambert

[11] 3,874,526
[45] Apr. 1, 1975

[54] SELF-UNLOADING GROUND VEHICLE

[76] Inventor: Jules Lambert, 3245 Bourjoly St., Three-Rivers, Quebec, Canada

[22] Filed: Aug. 22, 1973

[21] Appl. No.: 390,607

[30] Foreign Application Priority Data
Aug. 28, 1972 Canada .................................. 150410

[52] U.S. Cl. ............ 214/38 CA, 280/81 R, 280/401
[51] Int. Cl. ............................................ B66c 23/36
[58] Field of Search .......... 214/75 H, 38 CA, 86 A; 280/81 R, 43.23, 80 B, 405 R, 405 A, 406 R, 280/405 B, 460 R, 402, 401; 212/145

[56] References Cited
UNITED STATES PATENTS

| 2,410,241 | 10/1946 | Schramm | 280/405 R |
|---|---|---|---|
| 2,727,755 | 12/1950 | Hume | 280/405 A |
| 2,864,627 | 12/1958 | Kleinknecht | 280/401 |
| 3,103,288 | 9/1963 | Pruss | 280/401 |
| 3,376,988 | 4/1968 | Klosk | 214/38 CA |
| 3,420,313 | 1/1969 | Walberg | 280/405 B |
| 3,669,469 | 6/1972 | Hartelius | 280/460 R |
| 3,784,035 | 1/1974 | Dunbar | 212/145 |

FOREIGN PATENTS OR APPLICATIONS

| 677,061 | 12/1929 | France | 280/406 |
|---|---|---|---|
| 1,181,068 | 11/1964 | Germany | 280/450 |

*Primary Examiner*—Albert J. Makay
*Assistant Examiner*—Gary Auton

[57] ABSTRACT

A self-unloading wheeled vehicle including a main power-operated wheeled vehicle unit having a load carrying platform and an auxiliary wheeled trailer unit carrying an unloader including a post secured to the trailer unit and a boom carried by the upper end of the post and adapted to extend over the load-carrying platform. The trailer unit is hitched to the back of the main vehicle unit by means of a coupling assembly, which solely permits raising and lowering movement of the trailer unit while keeping the same parallel to itself, so as to prevent the boom from protruding laterally of the load-carrying platform during a turn of the vehicle and to prevent the boom from contacting the load when the vehicle moves on uneven ground. The system further includes power-operated lifting device carried by the main vehicle unit to raise the trailer unit with the wheels thereof off the ground. Thus, the payload of the truck can be increased, because the unloader is directly supported on the trailer unit. When the truck does not carry a load, the trailer unit is lifted off the ground to prevent wear and tear of its wheels.

6 Claims, 5 Drawing Figures

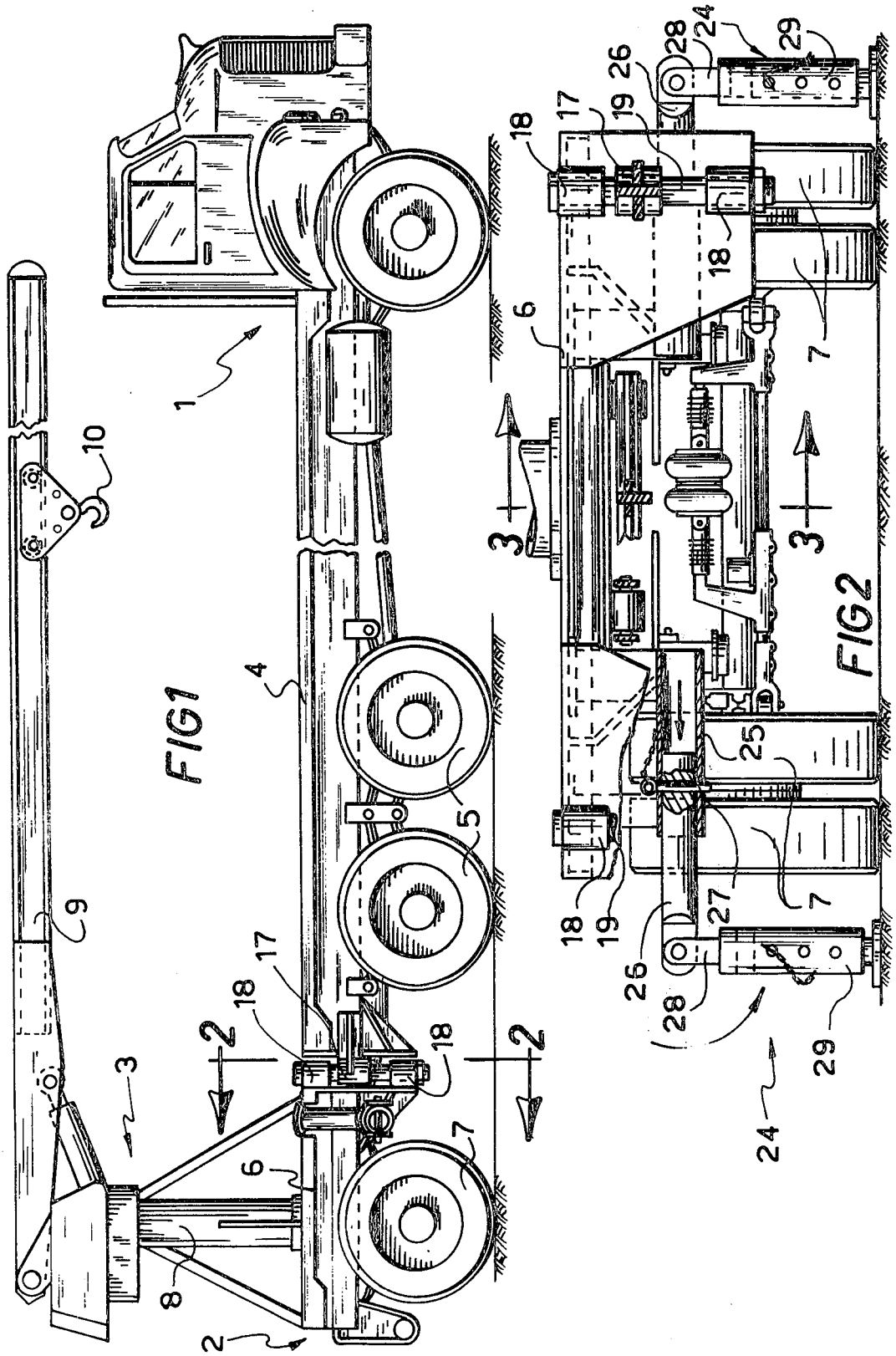

SELF-UNLOADING GROUND VEHICLE

This invention relates to a ground vehicle and, more particularly, to a self-unloading wheeled vehicle.

The self-unloading wheeled vehicle has existed for some time now and basically consists of a truck of the flat bed type having an unloader operatively mounted on the flat bed to load and unload pallets of, for instance, bricks and cement blocks on the remaining free portion of the flat bed. Such self-unloading truck is of the tandem rear wheel type which therefore takes an appreciably lighter payload, since the unloader is relatively heavy, some 8,000 pounds, and occupies a substantial area of the flat bed. There results a relatively inefficient payload.

This applicant has noted that the unloader is presently permanently mounted onto the vehicle and effectively reduces the utility and also the amount of utilization of the same vehicle. Besides, very often many trips are required to transport all the bricks, blocks of cement or other cargo to the desired site and then the unloader is uselessly travelled back and forth to that site.

It is the general object of the invention to provide a self-unloading wheeled vehicle which includes a main vehicle unit, a trailer unit carrying an unloader, and a coupling mechanism arranged to independently suspend the trailer unit relative to the main vehicle unit to take maximum advantage of the loading regulations and carry the maximum permissible load for an additional axle.

It is another general object of the invention to provide a self-unloading wheeled vehicle which takes maximum advantage of the existing regulations concerning trucks and axles loading, which allows the resulting vehicle to be used for other types of load and which allows to leave the unloader on a site to avoid inefficient and useless travel back and forth thereof to that site.

It is another object of the invention to provide a self-unloading wheeled vehicle including a main vehicle unit, a trailer Unit carrying an unloader and a coupling mechanism operated by engaging both units and arranged to provide only for vertical movement of the trailer unit with respect to the main vehicle unit and parallel to itself and to prevent any pivotal movement of the trailer unit with respect to the main vehicle.

It is yet another object of the invention to provide a self-unloading wheeled vehicle including a main vehicle unit, a trailer unit carrying an unloader, a coupling mechanism operatively engaging both units, said unloader carrying a boom which extends over the length of the platform of the main vehicle unit and which can move laterally with respect to the platform during loading and unloading operations and which does not protrude laterally of the load-carrying platform when the vehicle travels and which does not touch the load when the vehicle travels on uneven ground.

It is a more specific object of the invention to provide a self-unloading wheeled vehicle which includes a main vehicle unit of generally conventional construction and substantially full normal payload and a trailer unit carrying the unloader and detachably lockable to the main vehicle unit for independent and normal use of the latter.

It is another object of the invention to provide a self-unloading wheeled vehicle including a main vehicle unit, of generally standard construction, a trailer unit carrying an unloader, and a lifting mechanism operatively engaging both units and arranged to elevate the trailer unit and to lock the same in elevated position relative to the main vehicle unit, such that the latter unit advantageously carries the former unit when the latter unit is unloaded.

The above and other objects and advantages of the invention will be better understood in the light of the following detailed description of a preferred embodiment thereof which is illustrated, by way of example only, in the accompanying drawings, in which:

FIG. 1 is a side elevation view of a self-unloading wheeled vehicle according to the invention;

FIG. 2 is a transverse cross-sectional view as seen along line 2—2 in FIG. 1, with some parts broken away to better illustrate a steering assembly for the wheels of the trailer unit;

Figure 3:
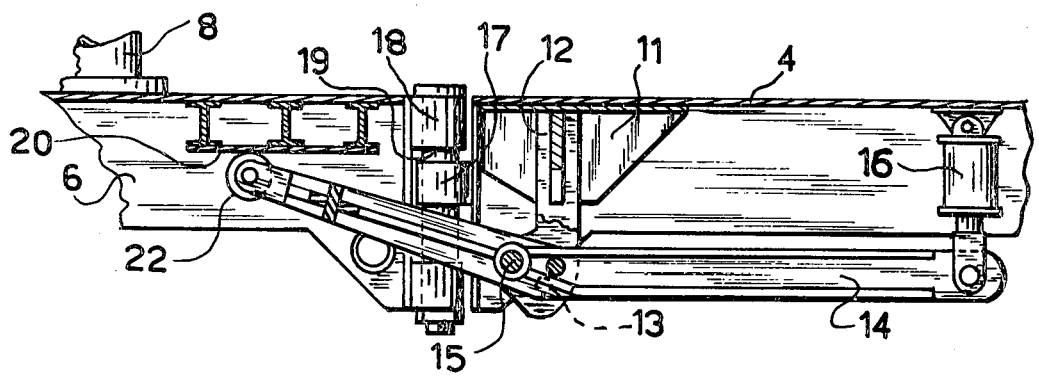
FIG. 3 is a longitudinal cross-sectional view illustrating the detachable coupling assembly as seen along line 3—3 in FIG. 2.
Figure 4:
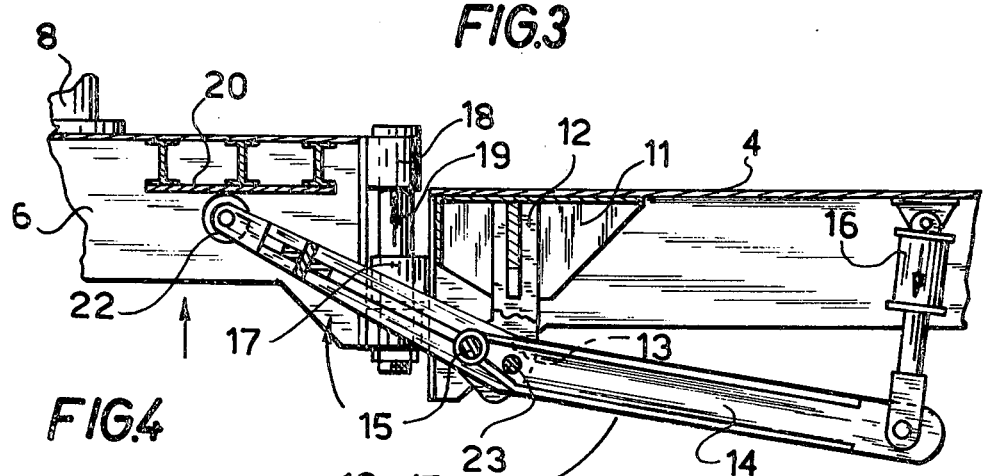
FIG. 4 is a view corresponding to FIG. 3 but with the trailer unit shown in the elevated position, as compared to the ground-engaging position of FIG. 3.
Figure 5:
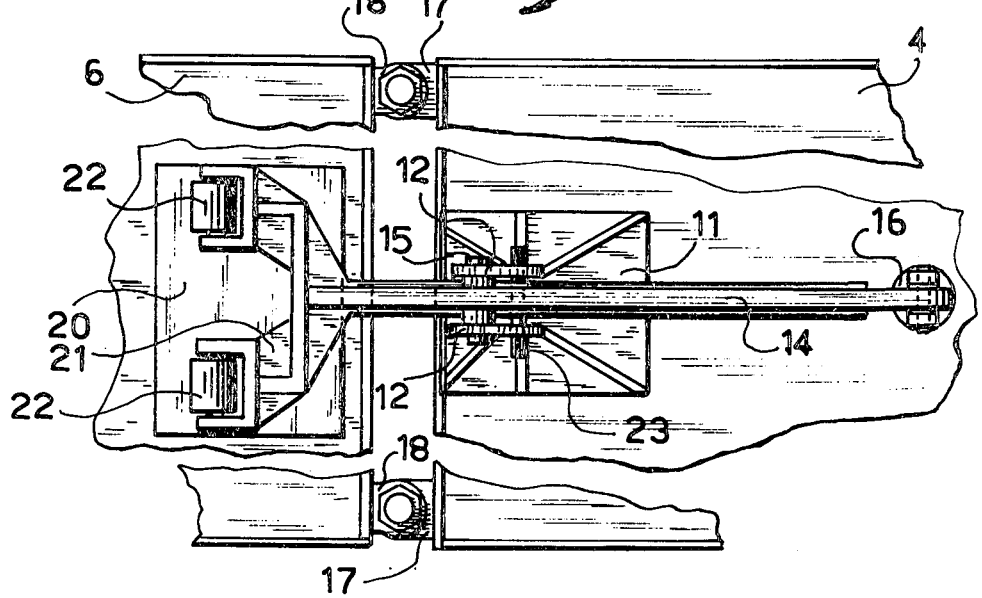
FIG. 5 is a bottom view of the detachable coupling assembly of FIGS. 3 and 4.

The illustrated self-unloading wheeled vehicle, as shown in FIG. 1, includes a main vehicle unit in the form of a flat bed truck 1 and a trailer unit 2 carrying an unloader 3 of known construction. The flat bed truck 1 could as well be replaced by a flat bed trailer or railway car without departing from the principle of the invention. The truck 1 is of the popular type, including a flat bed or platform 4 and tandem rear wheels 5.

The trailer unit 2 includes a platform 1 or deck 6, which has generally the same transverse outline as the flat bed 4. The platform or deck 6 is rotatably supported by a set of dual wheels 7 on each side, as will be hereinafter described in detail.

The unloader 3 generally includes a post or column 8 secured at the lower end onto the platform 6 and pivotally carrying a boom 9 at its upper end. Actuators, as is well known, are connected to the boom 9 to actuate the latter and the load handling elements such as the hook 10 carried by the same.

The flat bed 4 of the truck 1 is provided with a bracket 11 secured against the undersurface thereof and carrying a pair of downwardly depending legs 12. Each of the latter has a curved lower free end having a pair of apertures 13 therethrough. An elevating beam or lever 14 is pivoted onto the lower end of the legs 12 by means of a transverse pin 15. A hydraulic or pneumatic cylinder 16 is pivotally connected at its opposite ends to the underside of the flat bed 4 and to the inner end of the lever 14 and is adapted to produce pivoting of the lever 14 about the axis of the transverse pin 15 and to provide a suspension of the lever.

A pair of blocks 17 are secured against the rear portion of the flat bed 4 at laterally spaced-apart points thereof and are each provided with an upright bore therethrough. The trailer unit 2 has two pairs of upwardly aligned blocks 18 having vertically aligned bores therethrough. The blocks 18 are arranged to be aligned with the blocks 17, such that a pair of connecting bolts 19 may be inserted therethrough for detachable coupling of the trailer unit to the main vehicle unit. Sufficient space is provided between the blocks 18 of each pair to allow up and down sliding displacement of the block 17 between the corresponding set of blocks 18, thereby allowing independent suspension of the trailer unit relative to the main vehicle unit.

A guiding plate 20 is secured against the underside of the platform 6 and extends lengthwise thereof. The elevating lever 14 has a forked end 21 rollably carrying a pair of rollers 22 which are arranged to roll along the guiding plate 20 and to support the whole trailer unit 2.

When the hydraulic cylinder 16 is in a retracted condition, as in FIG. 3, the trailer unit 2 is in lowered and ground-engaging position and is supported by the outer end of the lever 14 by the action of the cylinder 16. A locking pin 23 may be engaged through the lever 14 and register with aligned holes through the legs 12 to rigidly lock the trailer unit in elevated position relative to the vehicle unit 1. The elevation of the trailer unit is obtained by extension of the cylinder 16 and insertion of the locking pin 23 when the wheels 7 of the trailer unit are off the ground. In lowered position, the trailer unit is carried by the wheels 7 and the vehicle unit is allowed to carry a normal or full load.

The wheels 7 of the trailer unit 2 are steeted by a steering mechanism which is illustrated in FIG. 2 and which is sold under the name "Steering Axle" by Rubery Owen Canada Limited. The "Steering Axle" automatically aligns itself to curves to cut tire scrub and improve the handling.

A pair of stabilizing legs 24 are mounted on the opposite sides respectively of the trailer unit 2 to rigidly hold the latter for unloading operation. Each leg 24 includes a transverse tube 25 having a rod 26 slidable therein and adjustable to different positions of lateral extension by a pin 27 extending therethrough and through the tube 25. A connector member 28 has an exterior end pivoted to the outer end of the rod 26. The other end of the piston member 28 is secured into a tube section 29. A foot pad is slidably engaged into the free end of the tube section 29 and a locking pin and apertures are provided to adjust the extension of the foot pad relative to the tube section 29.

It must be understood that many changes to the details of construction which have been described and illustrated fall within the principle and scope of the invention as defined by the appended claims.

What is claimed is:

1. A self-unloading vehicle comprising a main power-operated wheeled vehicle unit having a load-carrying platform and an auxiliary wheeled trailer unit, an unloader mounted on said trailer unit including a post secured to and upstanding from said trailer unit and a boom carried by the upper end of said post and adapted to extend over the length of said load-carrying platform, a coupling assembly coupling said trailer unit to the back of said main vehicle unit, so that the latter will tow the trailer unit, said coupling assembly permitting only raising and lowering movement of said trailer unit relative to said main vehicle unit while keeping said trailer unit parallel to itself so as to prevent said boom in said raised or lowered position from protruding laterally of said load-carrying platform during a turn of said main vehicle and to prevent said boom from contacting a load carried by said platform when the vehicle travels on uneven ground and power-operated means carried by one of said main vehicle unit and said trailer unit and engageable with the other of said main vehicle unit and trailer unit to raise said trailer unit with the wheels thereof off the ground while said main vehicle unit and trailer unit are still coupled together by said coupling assembly and wherein said coupling assembly is detachable and includes upright sliding connectors tractively joining said trailer unit to said main vehicle.

2. A self-unloading vehicle as defined in claim 1, wherein said upright sliding connectors include operative upright guides secured to the front of said trailer unit and laterally spaced from each other and complementary sliding members secured to said main vehicle unit and engaging said upright guides for sliding movement therealong.

3. A self-unloading vehicle as defined in claim 1, wherein said raising means include a lever pivoted to said main vehicle unit about a transverse axis thereof and having one end contacting the underside of said trailer unit and a hydraulic cylinder connected to said lever and to said main vehicle unit and arranged to urge said one end against the underside of said trailer unit.

4. A self-unloading ground vehicle as defined in claim 3, wherein said trailer unit includes an abutment plate secured against its underside and extending lengthwise thereof and said lever carries rollers mounted for rotation onto said one end of said lever about a transverse axis and arranged to roll along said abutment plate upon pivoting of said lever to cause raising of said trailer unit.

5. A self-unloading vehicle as defined in claim 4, wherein said coupling assembly includes a pair of blocks protruding from and being part of the front of said trailer unit at laterally spaced-apart points thereof and having upright apertures therethrough, upright guides removably extending through said upright apertures, and complementary sliding members secured to said main vehicle unit and slidably engaging said upright guides.

6. A self-unloading ground vehicle as defined in claim 1, wherein said trailer unit includes a wheel steering assembly rotatably holding the wheels thereof and arranged for commensurate steering of the latter relative to the front steerable wheels of said main vehicle unit.

* * * * *